(12) United States Patent
Gupta et al.

(10) Patent No.: US 11,321,787 B2
(45) Date of Patent: May 3, 2022

(54) AUTOMONOUS MULTI-CLOUD SOLUTION DESIGN AND FULFILLMENT VIA CROWDSOURCING

(71) Applicant: Kyndryl, Inc., New York, NY (US)

(72) Inventors: Manish Gupta, New Delhi (IN); Sreekrishnan Venkateswaran, Bangalore (IN); Jigar Navanitrai Kapasi, Bangalore (IN); Deepak Poola Chandrashekar, Bengaluru (IN)

(73) Assignee: KYNDRYL, INC., New York, NY (US)

( * ) Notice: Subject to any disclaimer, the term of this patent is extended or adjusted under 35 U.S.C. 154(b) by 209 days.

(21) Appl. No.: 16/533,825

(22) Filed: Aug. 7, 2019

(65) Prior Publication Data
US 2021/0042851 A1    Feb. 11, 2021

(51) Int. Cl.
| | |
|---|---|
| G06Q 10/10 | (2012.01) |
| G06Q 10/06 | (2012.01) |
| G06Q 30/02 | (2012.01) |
| G06Q 30/06 | (2012.01) |
| G06Q 50/00 | (2012.01) |
| G06Q 30/00 | (2012.01) |
| G06F 16/27 | (2019.01) |

(52) U.S. Cl.
CPC .......... *G06Q 50/01* (2013.01); *G06Q 30/016* (2013.01); *G06F 16/27* (2019.01)

(58) Field of Classification Search
CPC ...... G06Q 50/01; G06Q 30/016; G06F 16/27; G06F 16/93
USPC ........................... 705/1.1–912, 300, 304, 319
See application file for complete search history.

(56) References Cited

U.S. PATENT DOCUMENTS

| | | | |
|---|---|---|---|
| 7,222,302 B2 | 5/2007 | Hauser et al. | |
| 10,009,443 B1* | 6/2018 | Guigli | .................... H04L 41/12 |
| 2002/0040352 A1* | 4/2002 | McCormick | ........... G06Q 10/06 |
| | | | 705/80 |
| 2008/0140786 A1* | 6/2008 | Tran | ....................... H04L 51/32 |
| | | | 709/206 |

(Continued)

FOREIGN PATENT DOCUMENTS

| | | |
|---|---|---|
| CN | 108270621 A | 7/2018 |
| CN | 109445948 A | 3/2019 |

OTHER PUBLICATIONS

Mell et al., "The NIST Definition of Cloud Computing", Recommendations of the National Institute of Standards and Technology, Special Publication 800-145, Sep. 2011, 7 pages.

*Primary Examiner* — Jonathan P Ouellette
(74) *Attorney, Agent, or Firm* — Garg Law Firm, PLLC; Rakesh Garg; Ken Han

(57) ABSTRACT

A method, computer system, and a computer program product for multi-cloud solution design and fulfillment via crowdsourcing is provided. Embodiments of the present invention may include receiving a request, wherein the request includes computing requirements. Embodiments of the present invention may include parsing the received request into partitions. Embodiments of the present invention may include advertising the partitions to a plurality of participating members on a trusted network environment. Embodiments of the present invention may include receiving conceptual solutions to the partitions. Embodiments of the present invention may include evaluating the received conceptual solutions.

20 Claims, 7 Drawing Sheets

(56) References Cited

U.S. PATENT DOCUMENTS

| | | |
|---|---|---|
| 2009/0132211 A1 | 5/2009 | Lane et al. |
| 2011/0282793 A1* | 11/2011 | Mercuri ............. G06Q 30/0214 |
| | | 705/80 |
| 2012/0072985 A1* | 3/2012 | Davne .................... H04L 63/20 |
| | | 726/22 |
| 2013/0066968 A1* | 3/2013 | Ziegler .................. G06Q 10/10 |
| | | 709/204 |
| 2014/0278808 A1 | 9/2014 | Iyoob et al. |
| 2015/0341240 A1 | 11/2015 | Iyoob et al. |
| 2016/0019636 A1 | 1/2016 | Adapalli et al. |
| 2016/0080477 A1* | 3/2016 | Nedeltchev ......... H04L 65/1059 |
| | | 709/226 |
| 2017/0078410 A1 | 3/2017 | Rao |
| 2017/0236094 A1* | 8/2017 | Shah .................... G06Q 10/101 |
| | | 705/300 |
| 2017/0357486 A1* | 12/2017 | DeLuca .................... G06F 8/30 |
| 2018/0152506 A1* | 5/2018 | Simo .................... G06Q 10/101 |
| 2019/0318129 A1* | 10/2019 | David .................. H04L 9/3239 |

\* cited by examiner

AUTOMONOUS MULTI-CLOUD SOLUTION DESIGN AND FULFILLMENT VIA CROWDSOURCING

BACKGROUND

The present invention relates generally to the field of computing, and more particularly to cloud computing. Internet technology software management (ITSM) is used to handle a variety of services offered to customers. Services include designing and controlling IT services that focus on customer requirements. Orchestrations may handle many tasks for ITSM ranging from the provisioning and the configuring of cloud services to the configuring of customer service management.

SUMMARY

Embodiments of the present invention disclose a method, a computer system, and a computer program product for autonomous multi-cloud solution design and fulfillment via crowdsourcing. Embodiments of the present invention may include receiving a request, wherein the request includes computing requirements. Embodiments of the present invention may include parsing the received request into partitions. Embodiments of the present invention may include advertising the partitions to a plurality of participating members on a trusted network. Embodiments of the present invention may include receiving conceptual solutions to the partitions. Embodiments of the present invention may include evaluating the received conceptual solutions.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
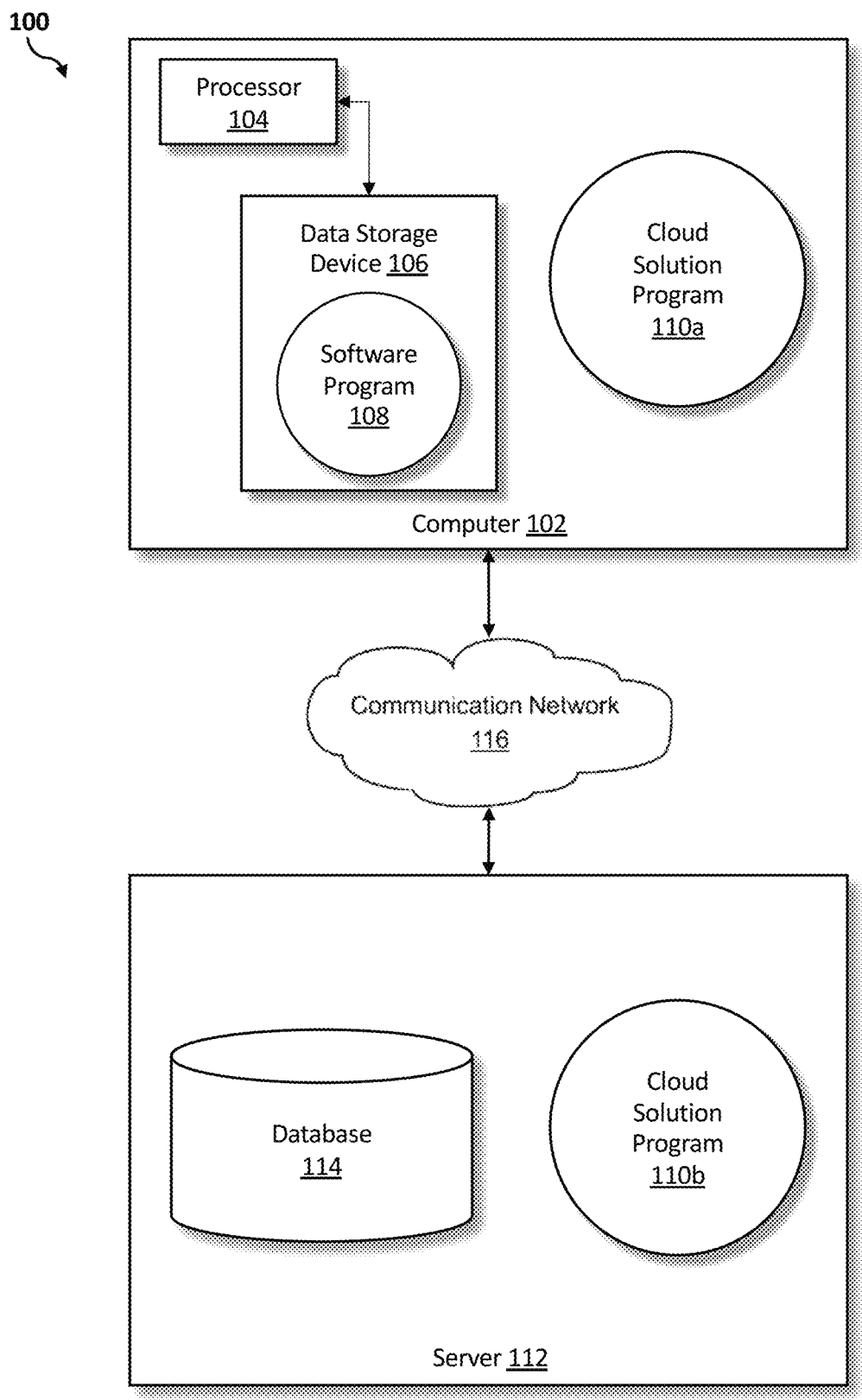
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

As previously described, internet technology software management (ITSM) is used to handle a variety of services offered to customers. Services include designing and controlling IT services that focus on customer requirements. Orchestrations may handle many tasks for ITSM ranging from the provisioning and the configuring of cloud services to the configuring of customer service management.

An influx of cloud services and IT service providers that offer a multitude of capabilities available on the market have caused an increase in costs for a customer to maintain required services, current services or to improve services. Due to the everchanging set of available capabilities in the cloud services industry and the IT services industry, it may be problematic to retain a skilled team of IT personnel to manage the orchestrations. Additionally, it may be costly to outsource services to a dedicated provider or an intermediary provider to manage the orchestrations. Therefore, it may be advantageous to, among other things, create an autonomous multi-cloud solution design and fulfillment platform using crowdsourcing technologies to fit the expanding cloud services and IT services market.

The following described exemplary embodiments provide a system, method and program product for processing multiple phases of an autonomous multi-cloud solution design and fulfillment process. As such, embodiments of the present invention have the capacity to improve the technical field of cloud computing by providing a crowdsourced approach to cloud services and IT services offered to customers. More specifically, a customer will provide a request order to a cloud solution program (i.e., cloud solution platform or cloud solution network) and the cloud solution program will capture the request order, the requirements of the request and offer multiple solutioning teams to participate in providing solutions to the customer while each solutioning team competes with other solutioning teams in the network. Automating the IT supply chain will allow multiple solutioning teams and solution providers to work simultaneously on different parts of the service requirements and solution verifiers may be leveraged to rate the solutions provided by the solutioning teams.

According to at least one embodiment, a crowdsourcing approach to a computing services workload may provide high level service models to customers. The crowdsourcing approach may bring together multiple people or companies may belong to multiple different roles to collaborate with each other with a goal of creating a securely brokered solution to customers computing needs. The brokered solutions may be conceptually created, solutioned and delivered in parts or partitions that contribute to a whole optimal service for the customer. The solutions may be created by many different groups of people or solvers in various solution designing and provider roles. Computing services may include cloud computing, multi-cloud computing, hybrid cloud computing, IT services, security services, container services, blockchain services and storage services. A high-level service model may be operated by the cloud solution program and may begin with capturing the functional requirements (FR) and the non-functional requirements (NFRs) of a customer service request. The customer may also be considered a client, a user or a workload owner. In capturing the FRs and the NFRs of the workload owner, key relationships may be identified, and the existing services and current configurations of the workload owner may be considered when finding solutioning teams and solution providers to the fulfill the request.

The cloud solution program may be considered a solution broker, and in the case of IT solutions, an IT broker or IT solution broker. The cloud solution program may automatically perform the functions described herein. In some embodiments, manual functions may be performed by the owner or administrator of the cloud solution program. Both the cloud solution program and the cloud solution program owner may be considered brokers and fulfill broker related computing request. The solution broker may consider the current and existing configurations for the customer and may create an orchestration by leveraging solutioning teams, cloud solution providers, solution verifiers and insurance providers to secure the creation of a conceptual solution, competition of the solution, and ultimately a concrete solution that will fulfill the requirements of the workload owner.

According to an embodiment, the solution broker receives a request from the workload owner. The solution broker may parse the requests into partitions and provide the partitions to the respective solutioning teams in a trusted environment or trusted network. The partitions may be advertised on the trusted network to solutioning teams that typically build and offer solutions based on the requests in each partition. The trusted network may operate using trusted code and trusted transactions that aid multiple independent parties to collaborate in a transparent, automated and secure manner. For example, multiple independent parties may register to become a part of a network that offers computing solutions and services to customers, thus, creating a trusted network of registered participating members.

Trusted code may ensure transparency and immutability which may be essential components of automation. Trusted code may include, for example, endorsed code that could be implemented on a peer node network or on a blockchain network. Additionally, trusted code may include any code that is operating in a centralized system or in a blockchain network of the broker that is signed and trusted in the specified network. For example, actions and operations performed by the broker may be performed using trusted code, such as advertising, evaluating, suggesting, notifying, allocating, combining and executing. Actions, operations, communication and transactions within the peer node network or the blockchain network may be considered trusted transactions and may ensure that the security, transparency and integrity of the transactions are maintained.

The solution broker may use domain modeling language to describe concepts related to the requested requirements received from the workload owner. The domain modeling language may also be integrated with other applications. Domain modeling language may relate to varying domains, for example, an IT domain modeling language may be used to describe IT related concepts that are necessary for requesting IT services in a cloud environment and in a managed services environment. The request may be represented, for example, in the form of a domain model and the representation may be realized via a domain modeling language, such as yet another markup language (YAML).

The IT domain modeling language may create a concept, such as a conceptual solution, without actual concrete implementations. Using domain modeling language as a concept allows for flexibility in adding, removing and modifying concepts, attributes and values based on the received request requirements. Taxonomies may also be used by the domain modeling language to classify request data. A taxonomy governance may be used to require an agreement to a requested change to the taxonomy. If consensus is reached regarding the change request to the taxonomy, then a new version of the domain modeling language may be released for use in the trusted environment. The domain modeling language may have the ability to describe abstract services that can be described using a hierarchical approach to represent the request requirements. A hierarchical approach may include, for example, dot notation hierarchy in a domain language that can express concept requests in a nested structure.

The solution broker may transmit parsed requirements from the workload owner's request to one or more solutioning teams for assessment. The solutioning teams may provide various computing solutions to address the requirements of the workload owner. Solution requirements may, for example, specify the relationship of the existing configuration items (CIs). Multiple solutioning teams may participate in offering solutions to part of the solution or a complete solution. The solutioning teams may offer solutions in an automated environment to the solution broker and when offering the solutions, the solutioning teams may be competing with other participating solutioning teams. An automated environment may include an environment that is automated within a peer node network or a blockchain network of participating members. Participating members (i.e., stakeholders) may include all members of a network relating to a particular domain. For example, a group of participating members for the IT domain described herein may include a client or a workload owner, a solution broker or an IT broker, solutioning teams, cloud solution providers, solution verifiers and insurance providers.

Commitments made by the solutioning teams may involve signing an electronic contract in a trusted environment. Electronic contracts may include, for example, smart contracts or a contract to obtain Level-3 support on-demand for a backup or a restore failure incident and if the provided service fails, then the electronic contract allows for an automatic deduction of a slippage penalty from the provider's bank account. Electronic signatures may be used to execute the electronic contracts. For example, encrypted signatures or Adobe® Sign (Adobe Sign and all Adobe Sign-based trademarks and logos are trademarks or registered trademarks of Adobe, Inc. and/or its affiliates).

Electronic contracts may be used to read and submit a requirement specification, for the partitioning of a requirement specification and assigning the requirement specification to solution providers and to read and submit a solution specification for a requirement specification or a solution for a partition of the specification. Electronic contracts may also provide an approval process for a concrete solution once a consensus is reached by all stakeholders in the transaction. Additionally, electronic contracts may be used for agreements made between each stakeholder (i.e., participating member) for the execution of the solution specification and for any changes or amendments to the agreements.

An automated solution supply chain or an automated IT supply chain is created within the trusted network and provides timely and competitive solutions for workload owners. By automating the solution supply chain process, a solution domain model becomes flexible and simplified to offer service requirements and to extend service requirements seamlessly and quickly. Timely service may be provided since multiple solutioning teams may be working simultaneously on various parts of a service request requirement.

Solution verifiers may be leveraged to verify solutions created by the solutioning teams by viewing, analyzing and rating the solutions provided to the solution broker for the workload owner. Insurance providers may be leveraged to insure the various parties within the trusted network, such as the solutioning teams, the workload owners, the solution verifiers, the IT brokers or cloud solution providers. Solution verifiers may be offered special roles in the peer node network or in the blockchain network if a blockchain platform is used. Special roles may include, for example, a backup or a restore of a Level-3 fix request and the solution verifier will guarantee that the fix does not introduce security loopholes and that the quality gate associated with the verification can be implemented either manually or programmatically. Solution verifiers may provide services that analyze the solution or the solution components either manually or programmatically. Solution verifiers may also provide a rating of workability related to the solution or the solution components. The rating of workability may include, for example, a rating related to restoring files, such as restoring a file having a size greater than 10 GB has a workability rating of 100% and a file having a size greater than 20 GB has a workability rating of 90%. The rating of workability may be transmitted back to the solution broker. Electronic contracts may be digitally executed by the parties in the trusted network that may create an agreement to perform a service.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a cloud solution program 110a. The networked computer environment 100 may also include a server 112 that is enabled to run a cloud solution program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 5, server computer 112 may include internal components 902a and external components 904a, respectively, and client computer 102 may include internal components 902b and external components 904b, respectively. Server computer 112 may also operate in a cloud computing service model, such as Software as a Service (SaaS), Analytics as a Service (AaaS), Blockchain as a Service (BaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the cloud solution program 110a, 110b may interact with a database 114 that may be embedded in various storage devices, such as, but not limited to a computer/mobile device 102, a networked server 112, or a cloud storage service.

According to the present embodiment, a workload owner operating a client computer 102 or a server computer 112 may use the cloud solution program 110a, 110b (respectively) to submit a request for proposal (RFP) to the solution broker for requested cloud and IT services. The cloud solution method is explained in more detail below with respect to FIGS. 2-4.

Figure 2:
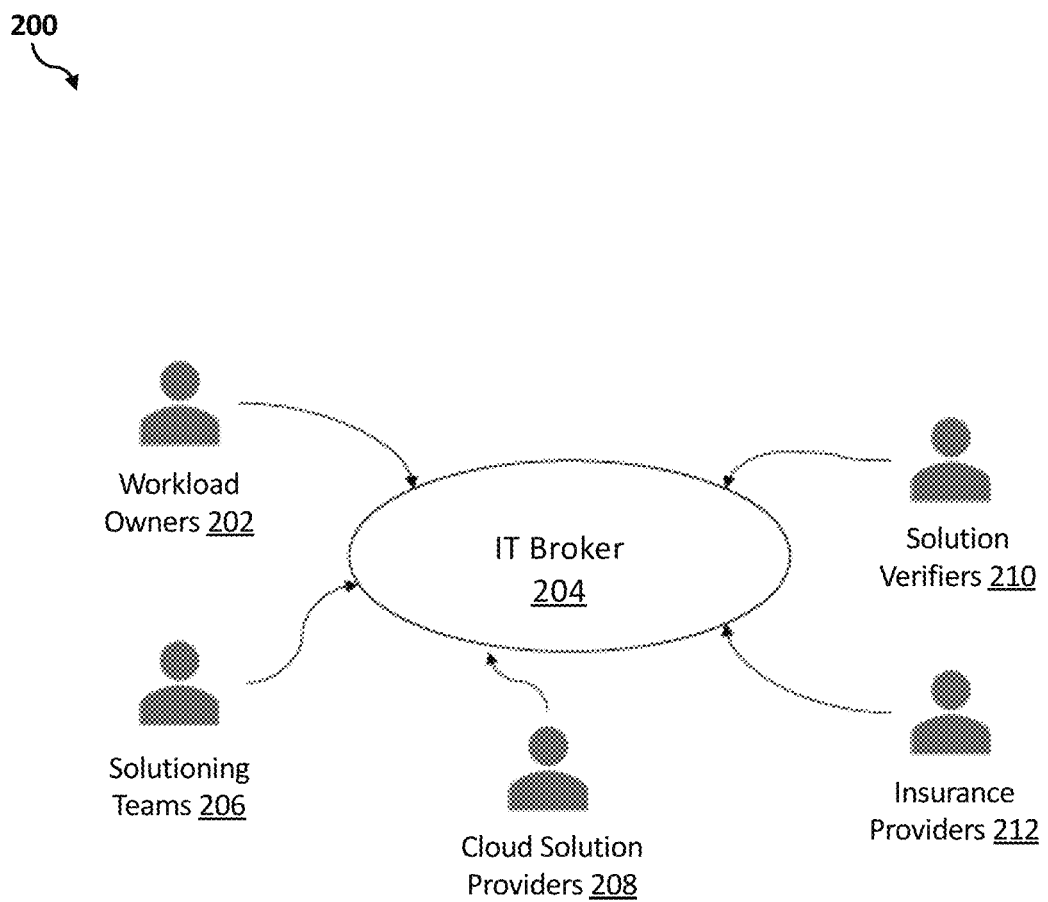
FIG. 2 is a block diagram example of the crowdsourcing parties in an autonomous multi-cloud solution design and fulfillment environment according to at least one embodiment.

Referring now to FIG. 2, a block diagram example of the crowdsourcing parties in an autonomous multi-cloud solution design and fulfillment environment 200 used by the cloud solution program 110a, 110b according to at least one embodiment is depicted. The crowdsourcing parties may also be known as the participating users, participating members, members, parties, peer node network members and blockchain network members. The crowdsourcing parties or participating members may be registered members of a trusted network and may communicate with each member using trusted code within the trusted network. Trusted code may include, for example, endorsed code that could be implemented on a peer node network or on a blockchain network. Each communication between participating members may contain electronic contracts or electronic signatures. In alternate embodiments, the communication may have added security such as encryption or encrypted messages and registered accounts based on usernames, passwords, encrypted data or biometric login features to access the trusted network.

The participating members may be routed by and through an IT broker 204. Parties involved in the autonomous multi-cloud solution design and fulfillment environment 200 may include the IT broker 204, a workload owner 202, one or more solutioning teams 206, one or more cloud solution providers 208, one or more solution verifiers 210 and one or more insurance providers 212.

A workload owner 202 may include a customer, a client or a user of the cloud solution program 110a, 110b. The IT broker 204 may receive requests, parse or partition data received from all parties and transmit or advertise data or portions of the data via trusted code to respective parties. An IT broker 204 may, for example, be a particular business unit of IBM® (IBM and all IBM-based trademarks and logos are trademarks or registered trademarks of International Business Machines Corporation and/or its affiliates). Solutioning teams 206 may include various companies that offer and deliver both conceptual and concrete computing solutions, such as IT solutions for clients. Solutioning teams 206 may create an optimal concept or a claim to a solution for the workload owner 202 based on the full set of data or a subset of data received by the IT broker 204. Solutioning teams 206 may evaluate the received partitioned data, suggest alternate or additional requirements, commit to solutions based on the created optimal concept and may create concrete solutions using trusted code.

Cloud solution providers 208 may include various companies that offer and deliver one or more cloud-based solutions to customers, such as entities that may offer infrastructure to a client based on client needs in order to fulfill the approved workload owner 202 request. Solution verifiers 210 may include one or more teams of people or companies that rate the solutions created by the solutioning teams 206 based on best practices. A consensus may be provided by multiple solution verifiers 210 within the autonomous multi-cloud solution design and fulfillment environment 200 regarding which is the best or optimal concept created by the solutioning teams 206. Insurance providers 212 may offer insurance policies to the transactions between the workload owner 202 and the solutioning teams 206. Insurance providers 212 may also offer insurance to the transactions between the solution verifiers 210, the workload owners 202 and the solutioning teams 206.

Figure 3:
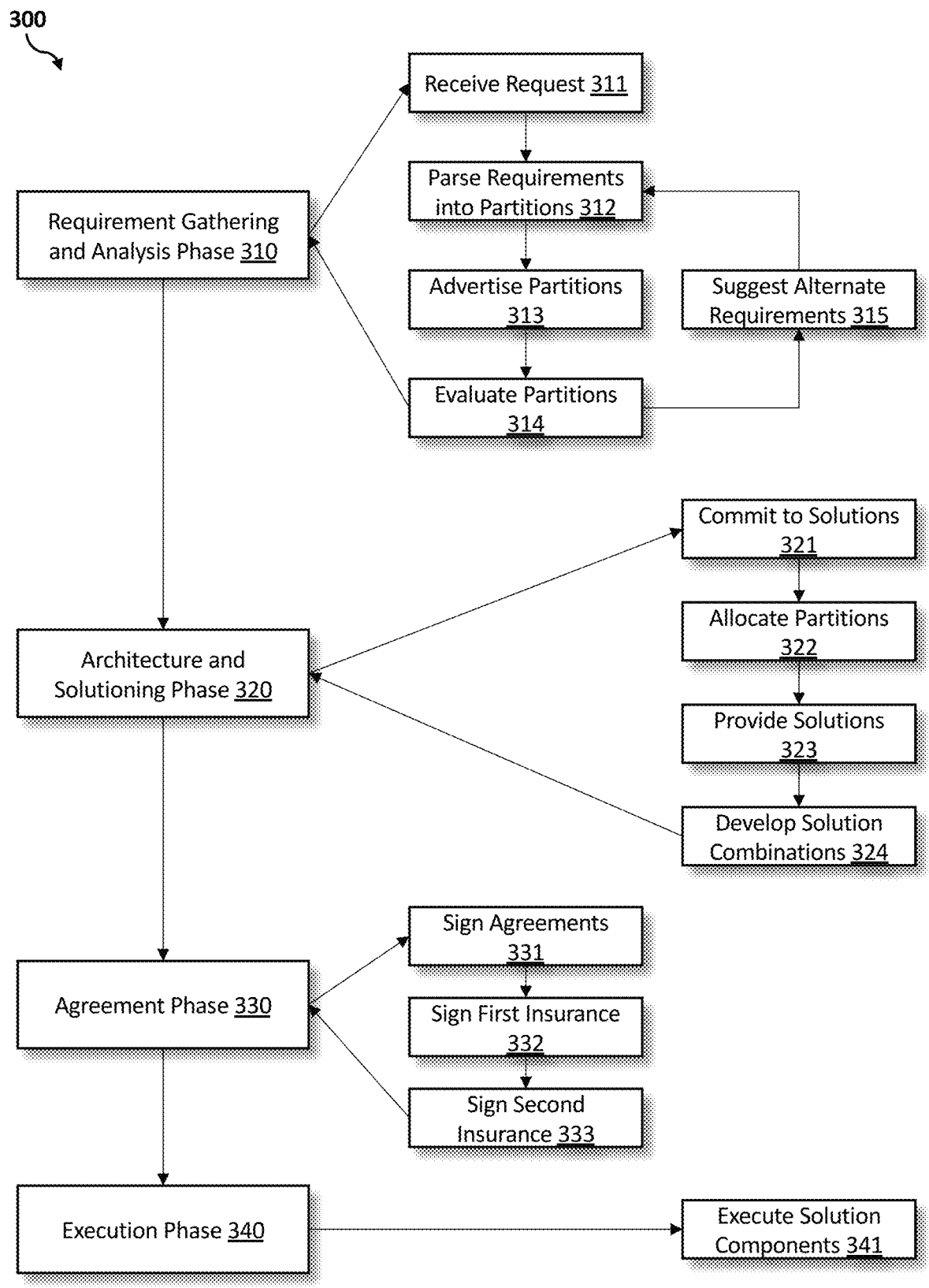
FIG. 3 is an operational flowchart illustrating a process for multiple phases of the autonomous multi-cloud solution design and fulfillment process according to at least one embodiment.

Referring now to FIG. 3, an operational flowchart illustrating a process for multiple phases of the autonomous multi-cloud solution design and fulfillment process 300 used by the cloud solution program 110a, 110b. The autonomous multi-cloud solution design and fulfillment process 300 may include multiple phases of transmitted communication over the participating members network to fulfill on the best solution for a request made by the workload owner 202. The first phase is the requirement gathering and analysis phase 310, the second phase is the architecture and solutioning phase 320, the third phase is the agreement phase 330 and the final phase is the execution phase 340. Each phase, according to at least one embodiment, is depicted.

At 310, during the requirement gathering and analysis phase, a request is received at 311, requirements are partitioned at 312, partitions are advertised at 313 and partitions are evaluated at 314. In some embodiments, alternate requirements are suggested at 315. An embodiment of the requirement gathering and analysis phase 310 is now depicted.

At 311, a request may be transmitted from the workload owner 202 to the IT broker 204. A request may include, for example, a service order from a client specifying requirements for dynamic computing services. The request may be in the form of an RFP in a structured data format. If the request is not in a structured data format, then known NLP methods may be used to transform the request from an unstructured data form to a structured data form. The RFP may include IT domain modeling language.

Requirements may include information at a high-level, such as a current cloud provider and independent IT domain modeling language and components. For example, domain modeling language and components may include infrastructure (INFRA) requirements such as central processing unit (CPU) information, operating system (OS) information, memory information and storage information. Domain modeling components may also include application requirements, service level requirements, non-functional requirements (NFRs) and security requirements.

At 312, the IT broker 204 parses the requirements received by the workload owner 202 into partitions. The IT broker 204 may parse the received requirements into discrete solution components called partitions. Each discrete partition may be considered an atomic unit to be architected or solutioned independently. The partitions may be used and leveraged by each party in the participating member network, such as the IT broker 204, the solutioning teams 206, the cloud solution providers 208, the solution verifiers 210, the insurance providers 212 and the workload owners 202.

At 313, the partitions created by the IT broker 204 are advertised to participating members. The participating members may communicate via the trusted network using trusted code. Trusted code may be used, for example, as the task of the broker code that implements a broker function automatically in the trusted environment or in an automated environment. Trusted code may be used to advertise the discrete solution components to the participating members. Advertising the partitions in the trusted network may include portal-based advertisements, command line interface (CLI) based advertisements, application programming interface (API) based advertisements, emails, alerts or notifications. For example, a solution broker, upon receiving a request from a customer, parses or breaks the request up into partitions that can be advertised or sent to multiple different IT vendors with the ability to provide solutions for the requirements.

At 314, the partitions are evaluated by the participating members. Upon receiving the one or more partitions, the IT vendors may put in a bid to create a conceptual solution for the partition. Advertised partitions may be evaluated simultaneously or at varying time periods during the transaction process. For example, after the solution broker partitions the customer request, the partitions are advertised to the solutioning teams 206 and the cloud solution providers 208 before being advertised to the solution verifiers 210 and the insurance providers 212. One rationale for advertising partitions simultaneously is that all participating members will be privy to a work order or a customer request that they may be analyzing and evaluating. One rationale for advertising partitions separately at different time periods may include obtaining conceptual solutions first before having other parties verify, rate and insure the proposed conceptual solutions.

Evaluating the partitions may vary depending on which participating member is providing the evaluation. The partitions may be evaluated based on the expertise, skill set or other constraints of the participating members. Irrespective of which timing rationale is preferred, each participating member may offer opinions, conceptual solutions, concrete solutions or services as related to the transaction and relevant to the partitioned requirements advertised by the IT broker 204. For example, if a solutioning team 206 is evaluating the one or more partitions, each partition is searched, checked and evaluated to identify how many of the partitions the solutioning teams 206 are capable of providing solutions for. The solutioning team 206 may employ trusted code to call upon automated approaches or manual approaches to evaluate the requirements in order to choose a subset. Evaluations may be made by the solutioning teams 206 based on the suitability of a solution. The solutioning team 206 may post the evaluated solution via trusted code. Automated approaches are rule based approaches and may include installing code to match requirements and capabilities. Automated approaches may also use domain language to decide whether or not to bid on a partition.

At 315, according to an alternate embodiment, suggested alternate requirements are made to the IT broker 204. For example, the IT broker 204 or the solutioning team 206, or both, may identify value added services for the workload owner 202 based on the requested service. Some value added services may include, for example, identifying gaps in the current service or provide alternative solutions based on service level agreements (SLAs), durability or availability.

According to an embodiment, if there is ambiguity relating to a partition, the solutioning team 206 may contact the IT broker 204 for clarity in a feedback loop manner. For example, the IT broker 204 may identify a need to provide additional requirements, amendments or changes to a request. Alternatively, the IT broker 204 may receive an inquiry by the solutioning team 206 or provide additional clarity back to the solutioning team 206 until a consensus is reached. Each additional requirement, clarity or communication transmission in the feedback loop may be separately transmitted between the IT broker 204 and the solutioning team 106 or may be transmitted in a consolidated manner.

At 320, during the architecture and solutioning phase, solutions are committed to at 321, partitions are allocated at 322, solutions are provided at 323 and solution combinations are developed at 324. An embodiment of the architecture and solutioning phase 320 is now depicted.

At 321, solutions are committed to by one or more participating members. Solutions are presented by making a claim to provide a solution to the partition. The claim may be transmitted to the IT broker 204 and may be regarding a commitment to provide a solution to the workload owner 202. An example of a claim may include a solution provider responding with a developed fix to address a backup or restore incident. The claim may be made, for example, by calling a representational state transfer (REST) API programmatically by the broker supplied interface. The claim may be transmitted to the IT broker 204 via trusted code. For example, the solutioning teams 206 create a claim for a subset of the requirements in the RFP. Each solutioning team 206 may evaluate the requirements and verify or check the solutioning team capabilities to fulfill the partition requirements, such as infrastructure capabilities, scaling capabilities or skill set capabilities. Each solutioning team 206 may post one or more claims to one or more partitions that they are capable of providing solutions for and the claims are submitted to the IT broker 204 via trusted code. Claim submission may include a manual transmission of the claim, an automated transmission of the claim or a post on the trusted network of the claim, each option being transmitted via trusted code. Posting a claim may programmatically inform the automated environment about the stake in the claim.

At 322, partitions are allocated to one or more participating members that have submitted a claim to provide solutions or services. The IT broker 204 may perform an initial screening of the claims. The IT broker 204 may store the information provided from each participating member relating to conceptual services offered, such as which solutioning teams 206 made a claim to stake which partitions. The initial screening may be an automated function and specifications may be parsed such that no syntax or semantic errors exist from a domain model perspective. After the initial screening, the partitions may be allocated to the respective participating members based on the claims provided using trusted code. The trusted code be used either automatically or manually. The participating members, such as solutioning teams 206, may invoke services that automatically create solutions before submitting the solutions back to the IT broker 204. For example, a rule-based mapping based on requirements employed to identify viable services to create a solution.

At 323, solutions are provided to the IT broker 204. The participating members that received an allocated partition may create and develop concrete solutions for the partition. The solutions may, for example, be represented as code that may be evaluated by the IT broker 204. The solutions also may have the ability to be integrated or combined with other participating member solutions. Multiple solutions may be submitted and potentially constructed by the IT broker 204. The multiple solutions may be based on the received solution components from the participating members.

At 324, solution combinations are developed by the IT broker 204. Based on all solutions to the partitions received by all participating members, the IT broker 204 may develop all possible permutations and combinations of partitions to constitute multiple end-to-end solutions. Each end-to-end solution may be ranked based on customer preferences and priorities. The IT broker 204 may ask the participating members to provide consensus regarding the individual partitioned solutions or the end-to-end solution. Consensus may be reached by each participant provider using external policies to provide an agreement for a given complete solution. This may be achieved by analyzing the solution and the solution partitions and by making a decision of agreement to support the solution. Inconsistencies in solutions may be identified for each solution to a partition by using rules to determine the capability of the provided solution.

Rules may include pre-defined rules for integrating solution components. For example, rules can be based on the highest ratings provided by solution verifiers 210, based on cost, based on time, based on an SLA or based on a weighted policy. The capability to execute a solution may be analyzed by the rules. The IT broker 204 may combine, based on the solutions provided, the customer preferences, the customer objectives and a ranking of the solutions in order to provide an optimal end-to-end solution. The IT broker 204 may choose which solutioned partitions provide the optimal result for the workload owner 202.

At 330, during the agreement phase, agreements are signed at 331 and a first insurance agreement is signed at 332. In some embodiments, a second insurance agreement is signed at 333. An embodiment of the agreement phase 330 is now depicted.

At 331, agreements are signed by participating members that have been chosen to participate in concrete solutions for the workload owner 202. The end-to-end solution chosen by the IT broker 204 is posted on the trusted network. The IT broker 204 and the respective participating members, such as the solutioning teams 206 and the cloud solution providers 208, may execute agreements based on the terms provided. Agreements may be executed using electronic signatures, for example, via a smart contract on a blockchain network. The electronic signatures may execute the agreement using the trusted code provided by the IT broker 204 based on the chosen solution components. The terms may be based on the solutions to the partitions and the overall solution for the workload owner 202. Terms may be created by participating members and the workload owner 202. For example, attributes such as financial terms, schedules and SLAs may be created by running trusted code.

Solution verifiers 210 may provide services that further analyze the end-to-end solutions or to analyze the solution components. The solution providers 210 may analyze the solutions manually or programmatically and then may provide a rating of workability. The workload owner 202 may choose a solution based on the rating of workability provided by the solution verifiers 210.

At 332, a first insurance agreement is signed between respective participating members. For example, workload owner 202 may choose to insure the proposed solutions. The workload owner 202 may pay a premium for the insurance, for example, against the solutioning teams 206, the cloud solution providers 208, the solution verifiers 210 or the IT broker 204. An insurance policy for the workload owner 202 may insure against a participating member defaulting and affecting an optimal or good outcome of the orchestration of the solution. Purchased insurance premium prices may be based on to the complexity of the orchestration of the solution and the rating provided by, for example, the solution verifiers 210 and the IT broker 204.

At 333, a second insurance agreement is signed between the respective participating members. For example, the solutioning teams 206, the cloud solution providers 208, the solution verifiers 210 or the IT broker 204 may pay a premium for an insurance policy against the workload owner 202. The policy may protect, for example, the solutioning team 206 and the cloud solution providers 208 against default by the workload owner 202. The policy may also protect the participating members against a default on agreed services between other participating members. For example, a solutioning team 206 may purchase a policy to protect against a default in cloud services from a cloud solution provider 208.

At 340, during the execution phase, the solution components are executed at 341. An embodiment of the execution phase 340 is now depicted.

At 341, the solution components are executed. The IT broker 204 may combine all of the solutions to partitions as code. The code may be created as a unified executable code for the end-to-end solution. The unified executable code may be expressed by code that uses templates to launch multiple cloud applications, such as Heat templates, Terraform® (Terraform and all Terraform-based trademarks and logos are trademarks or registered trademarks of HashiCorp, Inc. and/or its affiliates) and similar concrete technology implementations. The templates may be executed to create infrastructure and services to realize the end-to-end solution to fulfill the requirements of the workload owner 202.

Figure 4:
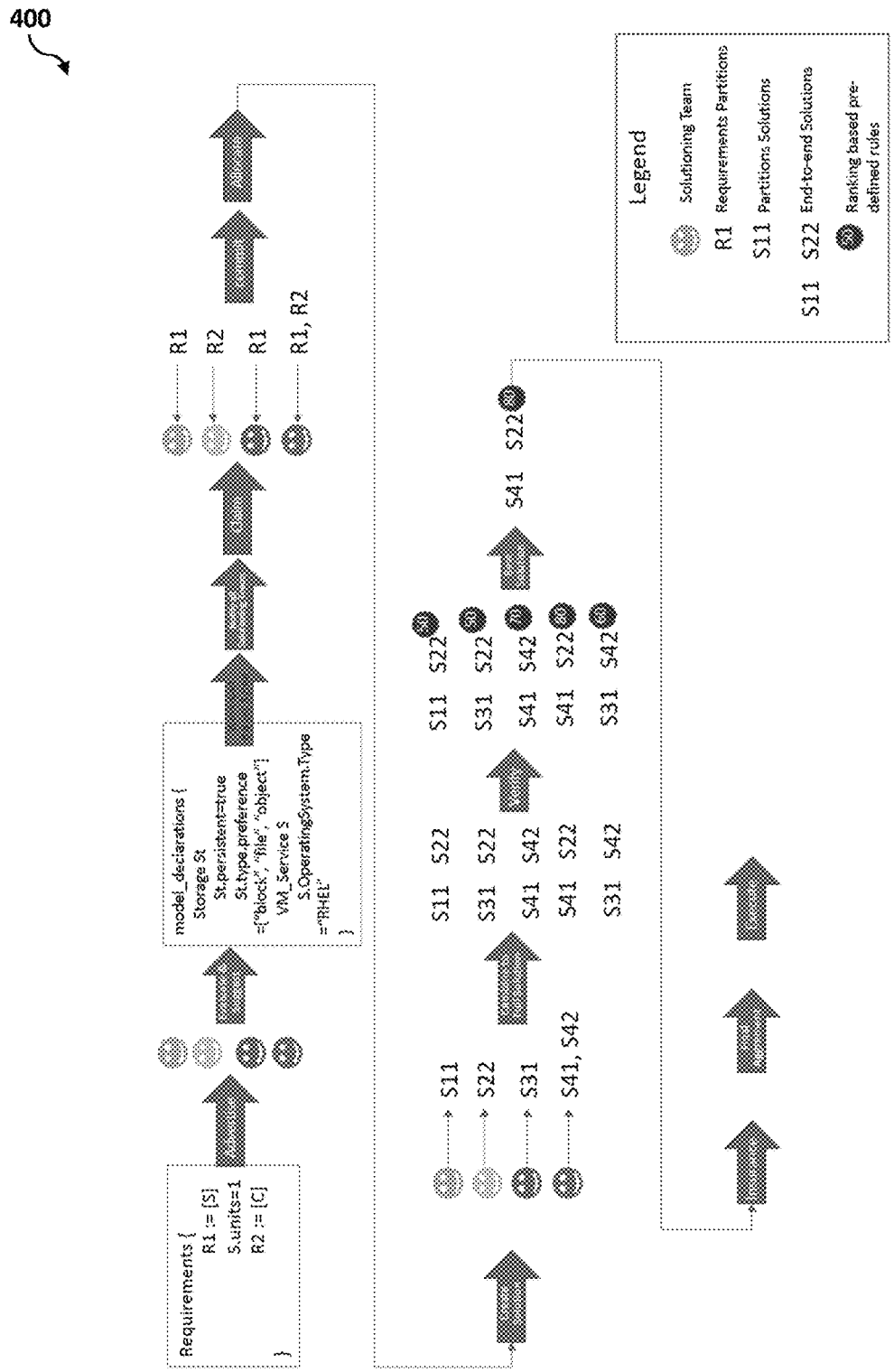
FIG. 4 is a block diagram example of the multiple phases of the autonomous multi-cloud solution design and fulfillment according to at least one embodiment.

Referring now to FIG. 4, a block diagram example of the multiple phases of the autonomous multi-cloud solution design and fulfillment 400 used by the cloud solution program 110*a*, 110*b* according to at least one embodiment is depicted. The autonomous multi-cloud solution design and fulfillment 400 example provides one embodiment of the autonomous multi-cloud solution design and fulfillment process 300 from the customer request to the implementation of the end-to-end solution.

A workload owner 202 may submit a request to the IT broker 204 that requires a server that is able to connect, 1-way, to configuration item (CI) X given a set of existing CIs and objectives and declarations (OD). Configuration items (CIs) may include {CI X, CI F}, where CI X represents an existing CI virtual machine service and CI F represents an existing CI firewall service. Example code is now provided that represents a customer's objectives and declarations (OD):

```
objectives_declarations OD {
    CostIncurred cost
        cost.maximum=0.01
        cost.unit="USD"
        cost.weight=0.3
    UserExperience ux
        ux.factor=0.25
        ux.weight=0.5
    ProviderTrust pt
        pt.weight=0.2
};
existing CIs:
    existing Cis {
        VM_Service X
        Firewall F
    };
requirements:
    requirements {
        Requirement_Unit R1, R2
            R1 := [S]
```

-continued

```
            S.units=1
            R2 := [C]
    }; and
model declarations:
    model_declarations {
        VM_Service S
            S.ServiceProvider.Preference := [IBM CoE,
            Infosys] // empty list
            indicates no preference
            S.TShirtSize:= ["1 vCPU", "4 GB", "256 GB"]
            S.SolutionProvider.Preference= [IBM CoE,
            Infosys]
            S.Owner.Email=name@ibm.com
            S.Location.Preference=["east"]
        Connectivity C
            C.link.Source=S
            C.link.Target=X
            C.link.bandwidth.value=10
            C.link.bandwidth.unit=Mbps
    }
```
Infosys ® (Infosys and all Infosys-based trademarks and logos are trademarks or registered trademarks of Infosys, Inc. and/or its affiliates).

An alternate embodiment for a request containing requirements from the workload owner 202 to the IT broker 204 may have additional requirements. For example, the workload owner 202 may require a server that is monitored and patched and able to connect, 1-way, to CI X given a set of existing CIs {CI X, CI F} and objectives and declarations (OD). The alternate model declarations code may be as follows:

```
model_declarations {
    VM_Service S
        S.ServiceProvider.Preference := [IBM CoE, Infosys] // empty
        list
        indicates no preference
        S.TShirtSize:= ["1 vCPU", "4 GB", "256 GB"]
        S.SolutionProvider.Preference= [IBM CoE, Infosys]
        S.Owner.Email=name@ibm.com
        S.Location.Preference=["east"]
    Connectivity C
        C.link.Source=S
        C.link.Target=X
        C.link.bandwidth.value=10
        C.link.bandwidth.unit=Mbps
    Monitoring M
        M.Monitor.Includes=[S]
    Patching P
        P.Patch.Includes=[S]
}.
```

Referring to FIG. 4, the IT broker 204 receives the requirements from the workload owner 202. The IT broker 202 then partitions and advertises customer requirements, R1 and R2, in a trusted code environment or using trusted code to the solutioning team 206. The solutioning team 206 may evaluate and suggest solutions in the format of model declarations code. Once the workload owner 202 agrees on a solution, the solutioning teams 206 may make a claim or a bid to create the solution for requirement partition, R1 and R2. After the IT broker 204 partitions and allocates the selected bids to each solutioning team 206 accordingly, each solutioning team 206 will create the solution to the partition received.

The created partition solutions, S11, S22, S31, S41 and S42, are transmitted back to the IT broker 204 for the purpose of amending, clarifying or combining the solutions to create an optimal end-to-end solution. The solutions may be verified and ranked by, for example, a solution verifier 210 and the best solution, or the highest ranked solution, may be presented to the workload owner 202. An insurance policy may be purchased by the participating members and final agreements may be executed.

It may be appreciated that FIGS. 2-4 provide only an illustration of one embodiment and do not imply any limitations with regard to how different embodiments may be implemented. Many modifications to the depicted embodiment(s) may be made based on design and implementation requirements.

Figure 5:
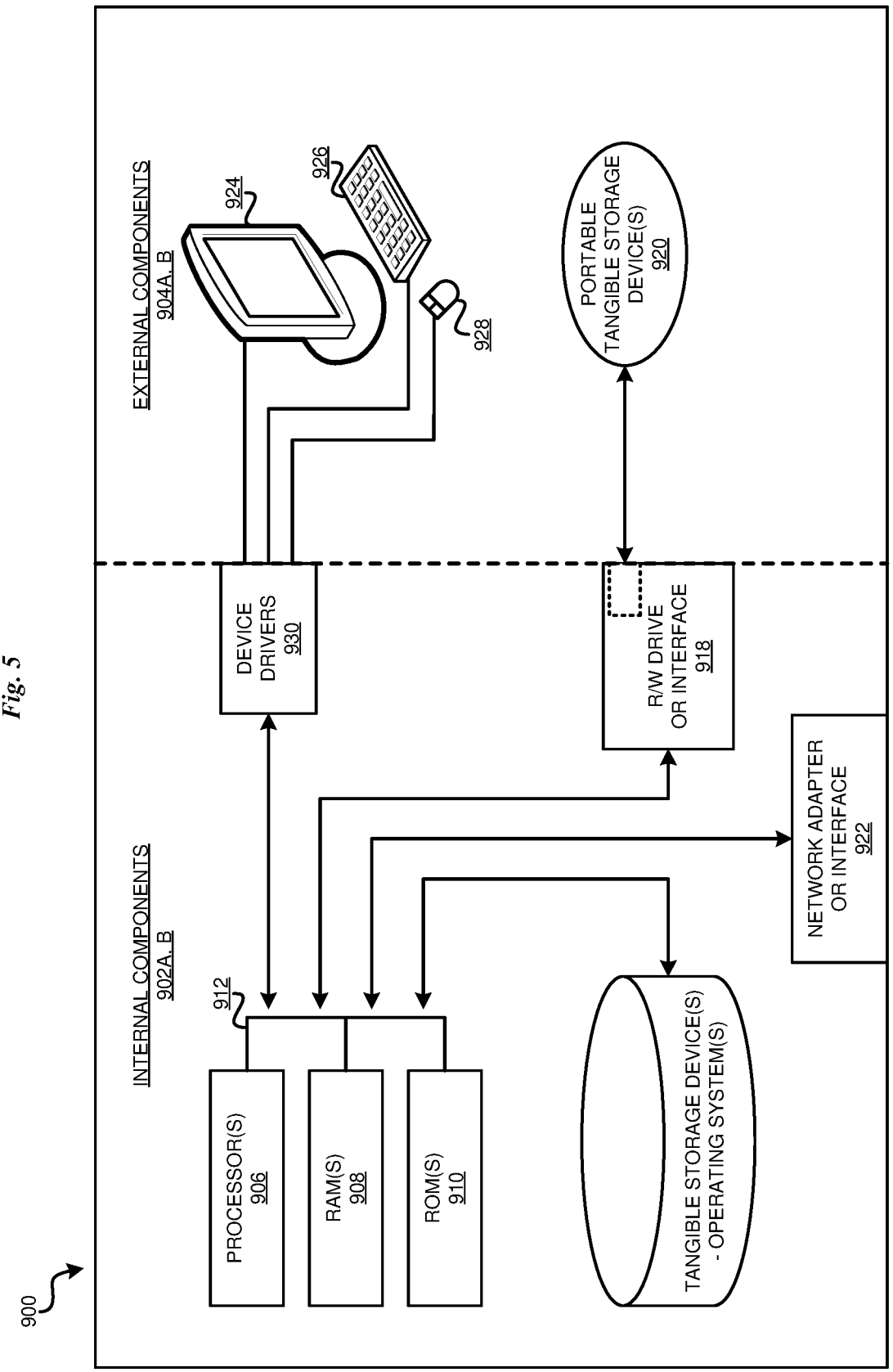
FIG. 5 is a block diagram of internal and external components of computers and servers depicted in FIG. 1 according to at least one embodiment.

FIG. 5 is a block diagram 900 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904a, b illustrated in FIG. 5. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the cloud solution program 110a in client computer 102, and the cloud solution program 110b in network server 112, may be stored on one or more computer-readable tangible storage devices 916 for execution by one or more processors 906 via one or more RAMs 908 (which typically include cache memory). In the embodiment illustrated in FIG. 5, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the cloud solution program 110a, 110b can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 and the cloud solution program 110a in client computer 102 and the cloud solution program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the cloud solution program 110a in client computer 102 and the cloud solution program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure or on a hybrid cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
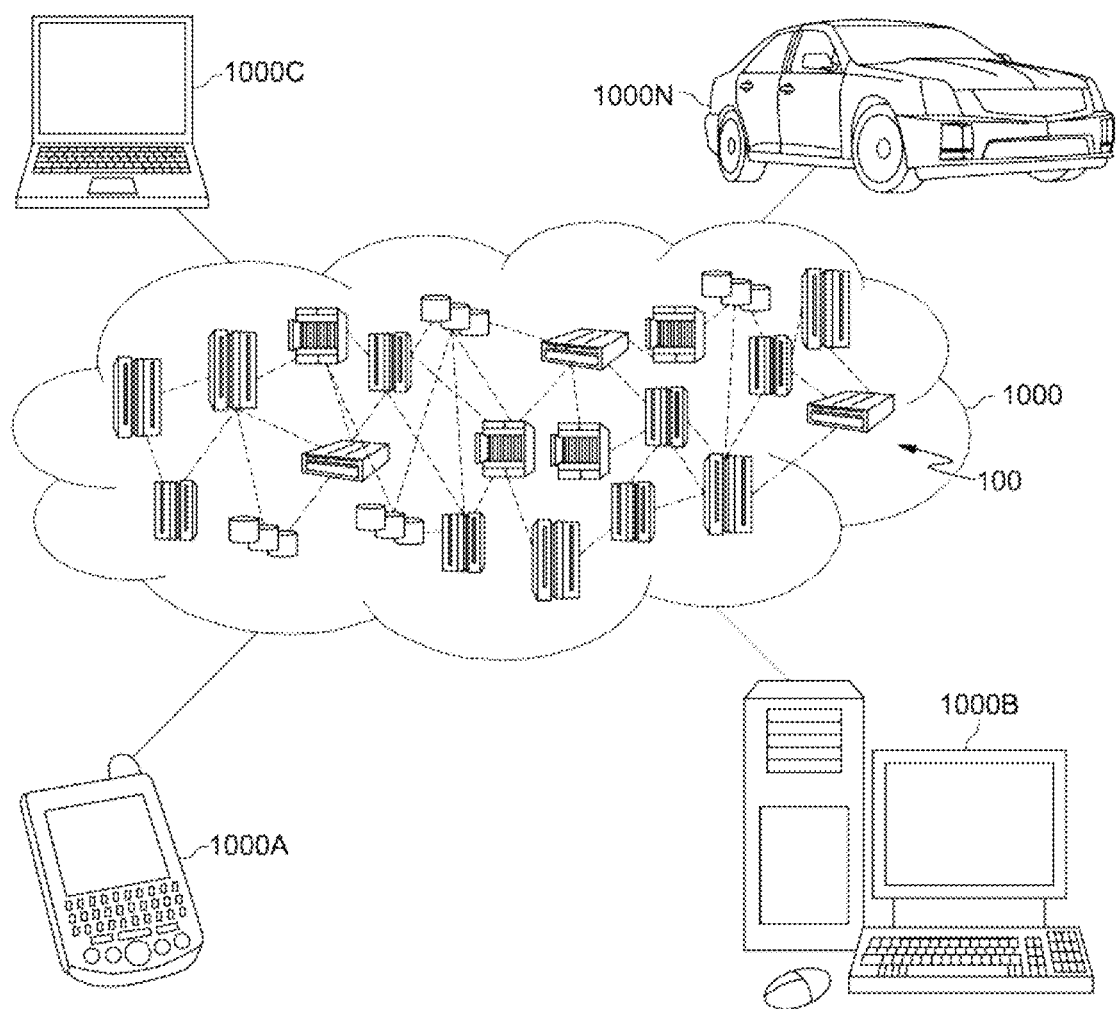
FIG. 6 is a block diagram of an illustrative cloud computing environment including the computer system depicted in FIG. 1, in accordance with an embodiment of the present disclosure.

Referring now to FIG. 6, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 6 are intended to be illustrative only and that computing nodes 100 and cloud computing environment 1000 can communicate with any type of computerized device over any type of network and/or network addressable connection (e.g., using a web browser).

Figure 7:
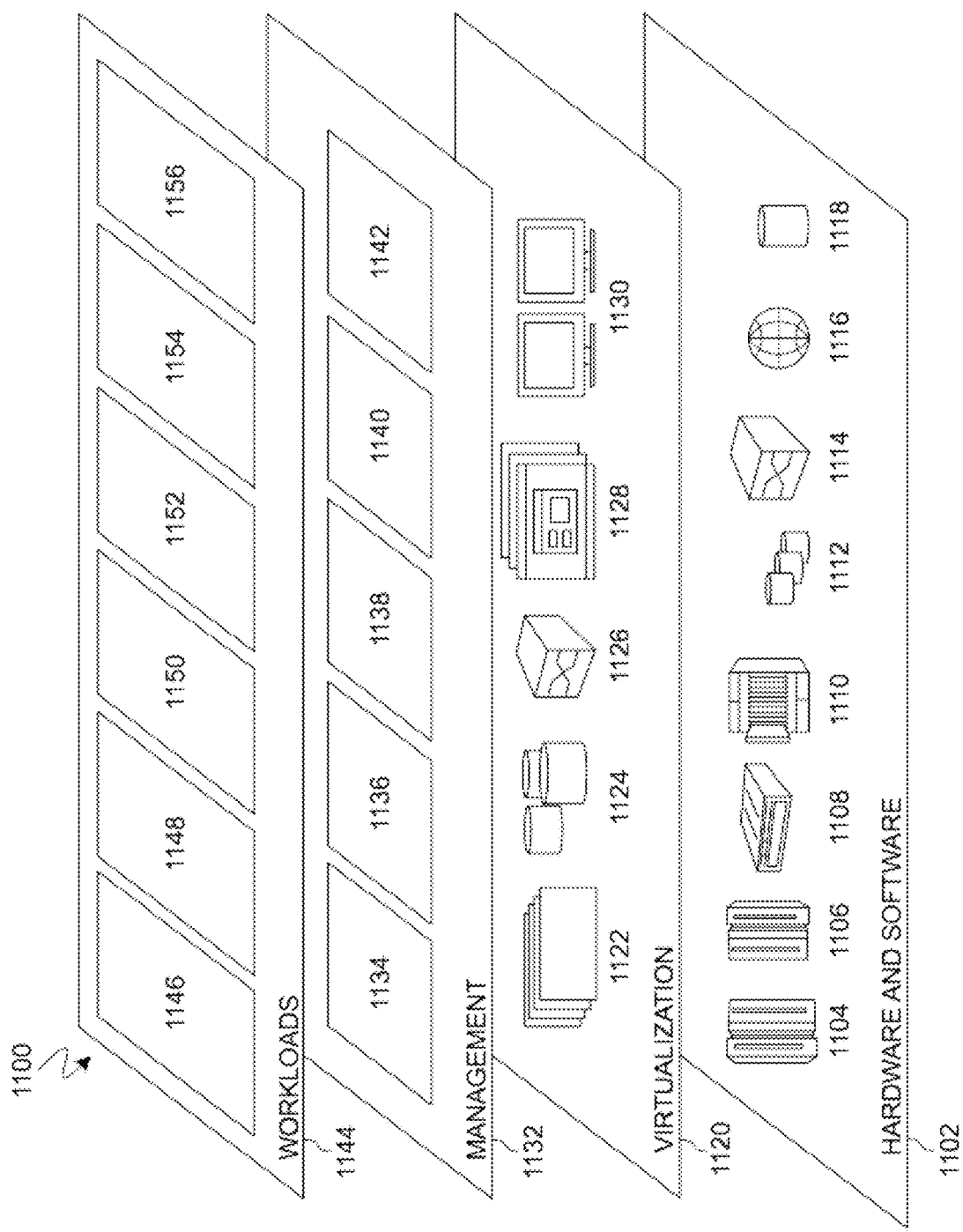
FIG. 7 is a block diagram of functional layers of the illustrative cloud computing environment of FIG. 6, in accordance with an embodiment of the present disclosure.

Referring now to FIG. 7, a set of functional abstraction layers 1100 provided by cloud computing environment 1000 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized.

Examples of workloads and functions which may be provided from this layer include: mapping and navigation 1146; software development and lifecycle management 1148; virtual classroom education delivery 1150; data analytics processing 1152; transaction processing 1154; and multi-cloud solution design and fulfillment platform 1156. A cloud solution program 110a, 110b provides a way to bring together multiple people or companies may belong to multiple different roles to collaborate with each other with a goal of create a securely brokered IT solution to customers that is delivered in parts or partitions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving, via a blockchain network, a request, wherein the request includes computing requirements expressed in a structured data format;
   parsing the received request into partitions;
   simultaneously advertising, via the blockchain network, the partitions;
   receiving, using a representational state transfer application programming interface executing as trusted code on a system on the blockchain network, partitioned solutions to the partitions;
   combining, into a plurality of end-to-solutions using a set of pre-defined rules, combinations of the partitioned solutions, the combining including identifying inconsistencies between one or more of the partitioned solutions;
   selecting, based on a rating of workability provided by a solution verifier via the blockchain network, an end-to-end solution; and
   executing, as unified executable code, the selected end-to-end solution, the unified executable code expressed as code using templates that, when executed, create infrastructure and services realizing the selected end-to-end solution.

2. The method of claim 1, further comprising:
   executing, using agreement-executing trusted code on the blockchain network, electronic agreements to fulfill components of the selected end-to-end solution, terms of the electronic agreements created by executing the agreement-executing trusted code; and
   executing insurance policies corresponding to the electronic agreements, wherein prices of the insurance policies are determined based on the rating of workability.

3. The method of claim 1, further comprising:
   receiving a suggestion for an alternate requirement to the request;
   repartitioning the request based on the alternate requirement; and
   simultaneously advertising the repartitioned request to the plurality of participating members.

4. The method of claim 1, wherein the partitions represent discrete solution components based on the received request.

5. The method of claim 1, wherein the partitions are advertised to a solution broker, a workload owner, solutioning teams, cloud solution providers, solution verifier teams and insurance providers.

6. The method of claim 1, wherein participation in the blockchain network requires a membership.

7. The method of claim 3, wherein the alternate requirements include amending or improving a current service, wherein improving the current service may include identifying gaps and common errors in the current service.

8. A computer system, comprising:
   one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the program instructions when executed by at least one of the one or more processors cause operations comprising:
   receiving, via a blockchain network, a request, wherein the request includes computing requirements expressed in a structured data format;
   parsing the received request into partitions;
   simultaneously advertising, via the blockchain network, the partitions;
   receiving, using a representational state transfer application programming interface executing as trusted code on a system on the blockchain network, partitioned solutions to the partitions;
   combining, into a plurality of end-to-solutions using a set of pre-defined rules, combinations of the partitioned solutions, the combining including identifying inconsistencies between one or more of the partitioned solutions;
   selecting, based on a rating of workability provided by a solution verifier via the blockchain network, an end-to-end solution; and
   executing, as unified executable code, the selected end-to-end solution, the unified executable code expressed as code using templates that, when executed, create infrastructure and services realizing the selected end-to-end solution evaluating the received conceptual solutions.

9. The computer system of claim 8, further comprising:
   executing, using agreement-executing trusted code on the blockchain network, electronic agreements to fulfill components of the selected end-to-end solution, terms of the electronic agreements created by executing the agreement-executing trusted code; and
   executing insurance policies corresponding to the electronic agreements, wherein prices of the insurance policies are determined based on the rating of workability.

10. The computer system of claim 8, further comprising:
    receiving a suggestion for an alternate requirement to the request;
    repartitioning the request based on the alternate requirement; and
    simultaneously advertising the repartitioned request to the plurality of participating members.

11. The computer system of claim 8, wherein the partitions represent discrete solution components based on the received request.

12. The computer system of claim 8, wherein the partitions are advertised to a solution broker, a workload owner, solutioning teams, cloud solution providers, solution verifier teams and insurance providers.

13. The computer system of claim 8, wherein participation in the blockchain network requires a membership.

14. The computer system of claim 10, wherein the alternate requirements include amending or improving a current service, wherein improving the current service may include identifying gaps and common errors in the current service.

15. A computer program product comprising:
one or more computer-readable tangible storage media and program instructions stored on at least one of the one or more computer-readable tangible storage media, the program instructions when executed by a processor cause the processor to perform a method comprising:
receiving, via a blockchain network, a request, wherein the request includes computing requirements expressed in a structured data format;
parsing the received request into partitions;
simultaneously advertising, via the blockchain network, the partitions;
receiving, using a representational state transfer application programming interface executing as trusted code on a system on the blockchain network, partitioned solutions to the partitions;
combining, into a plurality of end-to-solutions using a set of pre-defined rules, combinations of the partitioned solutions, the combining including identifying inconsistencies between one or more of the partitioned solutions;
selecting, based on a rating of workability provided by a solution verifier via the blockchain network, an end-to-end solution; and
executing, as unified executable code, the selected end-to-end solution, the unified executable code expressed as code using templates that, when executed, create infrastructure and services realizing the selected end-to-end solution.

16. The computer program product of claim 15, further comprising:
executing, using agreement-executing trusted code on the blockchain network, electronic agreements to fulfill components of the selected end-to-end solution, terms of the electronic agreements created by executing the agreement-executing trusted code; and
executing insurance policies corresponding to the electronic agreements, wherein prices of the insurance policies are determined based on the rating of workability.

17. The computer program product of claim 15, further comprising:
receiving a suggestion for an alternate requirement to the request;
repartitioning the request based on the alternate requirement; and
simultaneously advertising the repartitioned request to the plurality of participating members.

18. The computer program product of claim 15, wherein the partitions represent discrete solution components based on the received request.

19. The computer program product of claim 15, wherein the partitions are advertised to a solution broker, a workload owner, solutioning teams, cloud solution providers, solution verifier teams and insurance providers.

20. The computer program product of claim 15, wherein participation in the blockchain network requires a membership.

\* \* \* \* \*